INVENTOR.
JOSEPH ELBLING
BY
Shoemaker and Mattare
ATTYS.

June 2, 1970 J. ELBLING 3,515,962
POSITION CONTROL DEVICE FOR MACHINE TOOLS AND SIMILAR EQUIPMENTS
Filed Oct. 2, 1964 2 Sheets-Sheet 2

INVENTOR.
Joseph Elbling
BY
Shoemaker and Mattare
Attys.

United States Patent Office 3,515,962
Patented June 2, 1970

3,515,962

POSITION CONTROL DEVICE FOR MACHINE TOOLS AND SIMILAR EQUIPMENTS

Joseph Elbling, Ivrea, Italy, assignor to Ing. C. Olivetti & C., S.p.A., Ivrea, Italy, a corporation of Italy Filed Oct. 2, 1964, Ser. No. 400,986

Claims priority, application Italy, Oct. 7, 1963, 20,853/63

Int. Cl. G05b *19/18, 19/24*

U.S. Cl. 318—18 8 Claims

ABSTRACT OF THE DISCLOSURE

In a control device for moving a member of a machine-tool along a predetermined trajectory, a servosystem is responsive to positional orders applied thereto for moving said member and supplied by a program tape having recorded thereon successive orders, each one associated to an address identifying said order as pertaining to a particular displacement axis or auxiliary function means, and the bits of each order being recorded in parallel on a single transverse row of said tape along with the associated address bits.

The present invention refers to a position control device for machine tools or similar equipments, wherein a member movable along at least two axes is positioned along a predetermined continuous trajectory under the control of a series of successive orders recorded in binary notation on a program tape and representing successive instantaneous positions of the movable member along each axis, each order being associated with an address recorded on said tape and identifying in binary notation said order as pertaining to one of said axes.

A position control device of the above type is known, wherein each order is recorded on the tape as a series of groups of bits, said series being converted by means of shift registers and delay line synchronizers into parallel form as required for feeding the positioning servo systems. Each group of bits read from the tape has to be identified and distinguished from the digits of the other denominations of the order or from the address digits. Said known devices have the disadvantage that said identification is based on counting the bits or the groups of bits, whereby complication of reading equipment and increase of reading time are introduced. In such a device, counting errors entail misinterpretation of the code significance of the group of bits being read even if said bits are correctly read, because said code significance depends on the position of said group along the tape; moreover, reading errors affect the interpretations of the following digits. Special designators must be further recorded on the tape to establish points when counting begins, for instance at the beginning of each group of digits what entails further loss of space on the tape and complexity in the reading equipment. Also, the frequency at which the successive orders are made available from the tape for subsequent processing is a submultiple of the reading frequency of the successive groups of bits recorded on the tape, whereby the ultimate processing speed is unduly limited. Moreover, in order to avoid leaving blank spaces between contiguous orders on the tape or stopping the tape between the reading of contiguous orders, storage means must be provided to store an order while the next ones are being read on the tape, whereby the cost of the equipment is further increased.

The foregoing disadvantages are obviated by the control device according to the invention, which is characterized in that the bits of each order and the associated address bits are recorded in parallel on a single transverse row of the tape.

Accordingly, an object of the present invention is to increase the speed with which the orders are read and the processing speed and reduce the length of tape and the complexity of the equipment involved in applying the orders to the position sensing devices which control the positioning servomotors or equivalent devices.

A further object of the invention is to improve reliability of operation and avoid errors in reading and processing the program data and, should the tape reading equipment misinterpret or miss a group of bits, not to affect the reading and the interpretation of the following groups.

A further object of the invention is to allow the control device to be operated for positioning the movable member along different trajectories under the control of a single program tape.

A further object of the invention is to simplify the circuits required for selectively connecting the servomotors of the various axes under the control of the address signals to a digital-to-analog converter fed by the tape reader.

In the position control devices of the aforementioned type the positions represented by the successive orders are very close to one another, whereby a great accuracy may be achieved in positioning the movable member. If the program device supplies a wrong order, say an order wherein one or more bits are wrong, so that the position represented by said order differs considerably from the positions represented by the next preceding orders, the servomotor is caused to produce a sudden and uncontrolled displacement of the movable member. Especially in the case of a machine-tool, this may involve harmful consequences, such as failing to attain the prescribed tolerances as to the surface finish, damaging the workpiece, or even damaging the tool. To avoid this occurrence, it has been proposed to make a comparison between the present position of the movable member and the position corresponding to the new positional order being read, the machine tool being stopped should the difference between the two compared positions be found to be exceedingly great. However, stopping the machine entails, besides the danger of damaging the workpiece, a substantial loss of time because after a stop the tool must be generally returned to the starting point of the profile to be cut prior to restart the machining operation.

Therefore, the machine being stopped upon reading each wrong order, the machining operation ultimately proves exceedingly long and expensive. Such disadvantages are also obviated by the control device according to the invention, which is further characterized in that each new order supplied by the program device is compared with the order that at that moment controls the servomotor, the new order being sent to replace in the control the old one, or being ignored, according as to whether the difference between the positions represented by said two orders is below a predetermined limit or not.

Accordingly, a further object of the invention is to provide a novel criterion and novel means for checking the accuracy of the positional orders being read on the taped to prevent the device from being affected by wrong orders.

A further object of the invention is to provide means for stopping the operation of the device should not permissible sequence of wrong orders occur.

These and other objects and features of the invention will be apparent from the following description of a preferred embodiment thereof, taken in conjunction with the accompanying drawings, wherein.

Figure 1:
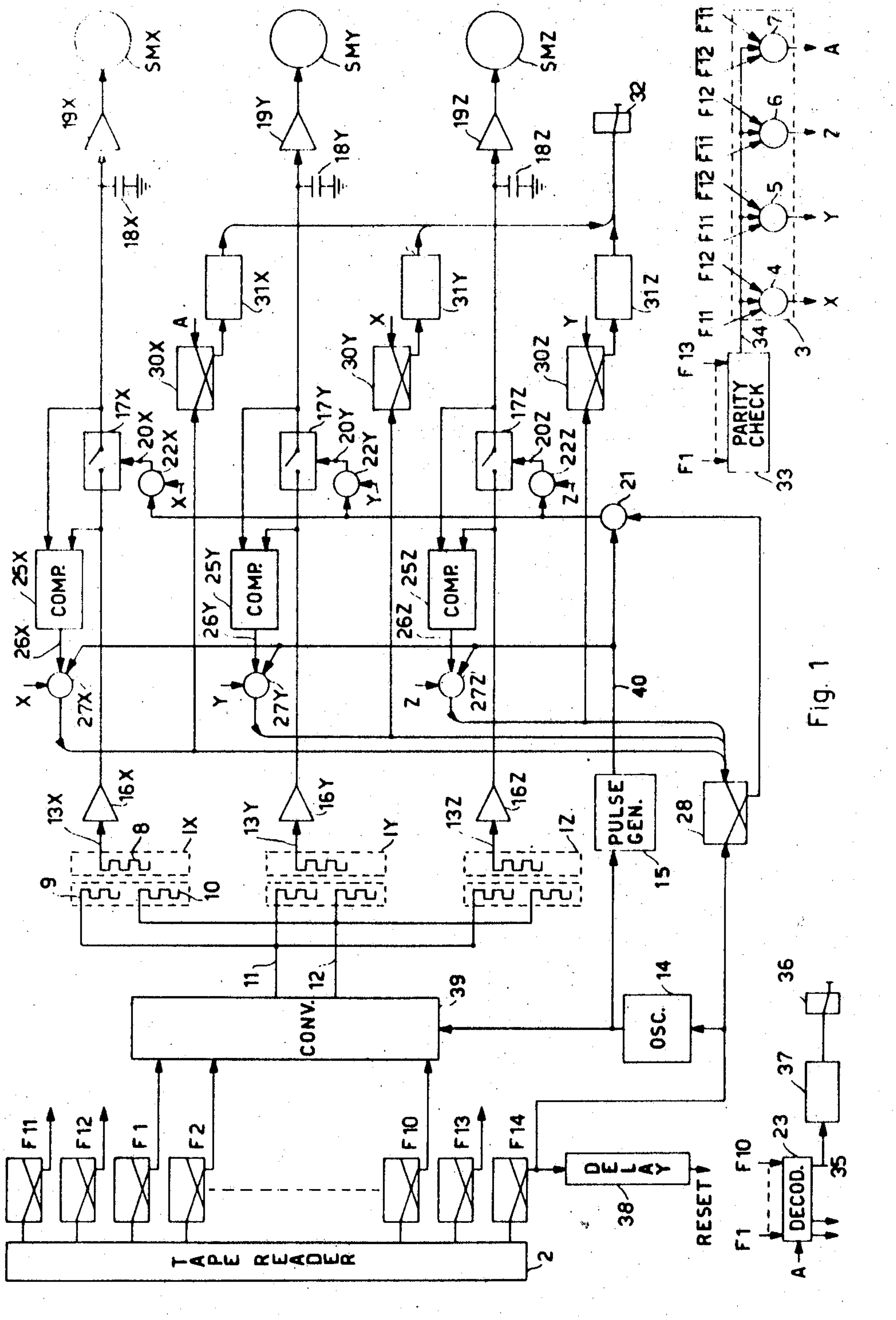
FIG. 1 shows a block diagram of the circuits of the position control device according to the invention.

According to the embodiment illustrated in FIG. 1, the device is adapted to control a machine-tool provided with a fixed tool and with a table movable along three axes (X, Y, Z) under the control of three servomotors (SMX, SMY and SMZ). Furthermore, the machine is responsive to auxiliary orders for carrying out auxiliary operations, such as the control of the coolant or lubricant, the change of the spindle speed, the automatic change of the tool etc. Ten bits being available to represent an auxiliary order. 1024 different auxiliary functions may be controlled. The positional and auxiliary orders are supplied to the machine by a program device, e.g. a magnetic tape containing fourteen tracks, i.e., thirteen information tracks and a clock track.

In each group of thirteen bits recorded on the tape, on a single row perpendicular to the tape feed direction (FIG. 2), the first ten bits, which are recorded on tracks P1 to P10 respectively, represent either a positional order representing in binary notation the coordinate of a point to be reached by the movable member of the machine along a given axis, or an auxiliary order; two bits, which are recorded on tracks P11 and P12 respectively, indicate the address of said order in that they show whether it is a positional order relating to axis X, Y or Z, or an auxiliary order. A last bit, which is recorded on track P13, is a parity check bit, chosen so that the total number of bits equal to "1" in the group of thirteen bits recorded on said row is always an odd number.

Therefore it is apparent that, contrary to the known program tapes, the address bits are recorded on specialized longitudinal tracks allotted thereto, whereby no special designators are required to distinguish addresses from orders.

The output of the tape reader 2 may be regarded as an input information channel of the time division multiplex type on which the successive orders are made cyclically available according to the sequence: Axis X, Axis Y, Axis Z, Auxiliary function A, as symbolically indicated in FIG. 2 by the letters X, Y, Z, A associated with the vertical rows of the tape, whereby four information channels X, Y, Z, A are effectively allocated in said input channel.

After suitable processing, the aforesaid four channels are separated and routed, under the control of the associated address signals, to control the servomotor for the axes X, Y, Z or the relays comanding the auxiliary functions respectively.

If N is the number of rows recorded per length unit on the tape and if V is the tape running speed, NV is the frequency at which the orders are made available on the output of the tape reader, and $NV/4$ is the frequency at which the orders are made available for controlling each axis.

The thirteen bits of each group read by the tape reader 2 on track P1 to P13 are stored in thirteen bistable circuits F1 to F13. The outputs of the bistable circuits F11 and F12, which, as already stated, represent a two-bit address, feed an address decoder 3, comprising four "AND" circuits 4, 5, 6 and 7. One of the four outputs X, Y, Z or A, of the address decorder 3 is energized according as to whether the order being then read and stored in the bistable circuits F1 to F10 refers to axis X, to axis Y, to axis Z or to the auxiliary functions. The outputs of the bistable circuits F1 to F10, which, as already stated, represent an order, feed a digital-to-analog converter 39 which is common to the three axes and exhibits an analogue representation of said order simultaneously to three position sensing devices IX, IY and IZ corresponding to axes X, Y, Z respectively. Each of said position sensing devices I may be of the type described in the U.S. Pat. No. 2,799,835, and comprising a fixed multipolar winding 8 as well as a pair of movable windings 9 and 10, fixed to the movable member of the machine tool. The position of the movable member with respect to the fixed portion may then be represented by means of the relative displacement between the fixed winding and the movable windings, expressed as an angle in electric degrees, bearing in mind that the pole pitch of fixed winding 8, equal to 360 electric degrees, is equivalent to 2 mm. for instance. In this case, the digital-to-analog converter 39 may be a binary form of the type described in U.S. Pats. 2,839,711 and 2,849,668 or may be of the type disclosed in the British Pat. 821,187. Said converter 39, activated by a 10 kHz., sinusoidal oscillator 14, supplies on output 11, which feeds the movable winding 9, a sinusoidal signal, having a 10 kHz. frequency and a maximum amplitude proportional to the sine of said angle, and on output 12, which feeds the movable winding 10, a sinusoidal signal having a 10 kHz. frequency, and a maximum amplitude proportional to the cosine of said angle. For the purposes of the present description it is sufficient to point out that the digit-to-analog converter 39 comprises a first set of impedance elements which can be selectively connected in a chain between the oscillator 14 and the sine output 11, a second set of impedance elements which can be selectively connected in a chain between the oscillator 14 and the cosine output 12, and a group of ten electromagnetic relays, which, under the control of the ten bits stored in the bistable circuits F1 to F10 respectively, operate a set of switches to selectively connect said impedance elements in said chains, whereby on the outputs 11 and 12 there is obtained a sinusoidal signal which is a replica of the signal produced by the oscillator 14 with an amplitude proportional to the sine and cosine respectively of the number (positioned order) represented by said ten bits. On the output 13X of the position sensing device IX, there is then obtained a sinusoidal signal having a 10 kHz. frequency and a maximum amplitude proportional to the difference between the present position of the movable member of the machine along axis X and the position represented by the order now stored in the bistable circuits F1 to F10, shifted in phase an amount equal to either 90° or 270° with respect to the output signal of said oscillator according to the sign of said difference (see FIG. 3).

Similar signals are obtained for axis Y and axis Z on outputs 13Y and 13Z respectively. With reference to FIG. 1, it should be pointed out that, although the movable windings 9 and 10 of the position sensing devices IX, IY, IZ are logically connected in parallel to the single common digital-to-analog converter 39, it is convenient to connect all the windings 9 in series with each other and all the windings 10 in turn in series with each other to ensure proper equality in the currents flowing therein. The output signals of the position sensing devices IX, IY, IZ are amplified by amplifiers 16X, 16Y and 16Z respectively and transferred, through switches 17X, 17Y and 17Z respectively, to condenser-type analog memories 18X, 18Y and 18Z respectively, which are arranged to store the maximum amplitude of said signals in order to feed, through amplifiers 19X, 19Y and 19Z, respectively the servomotors SMX, SMY and SMZ respectively. Each switch 17X, 17Y, 17Z is adapted to be closed, so as to establish between amplifiers 16X, 16Y, 16Z respectively and memories 18X, 18Y, 18Z respectively, a path of negligible impedance, throughout the time during which a sampling pulse, generated as described later, is present on the switch control terminals 20X, 20Y, 20Z respectively.

Figure 2:
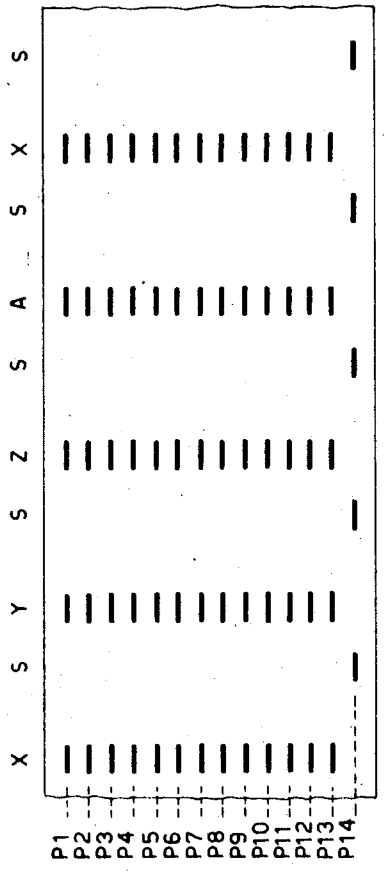
FIG. 2 shows the location of the digital signals on the tape in the device illustrated in FIG. 1.
Figure 3:
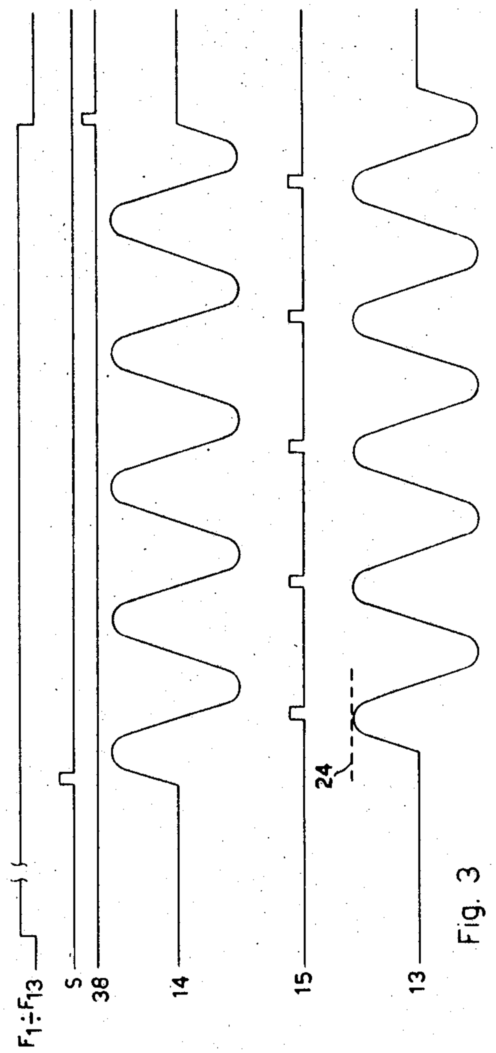
FIG. 3 shows a diagram of some signals present in the device shown in FIG. 1.

After reading each group of thirteen information bits on tracks P1 to P13, a clock signal S is read on track P14 of the tape, FIGS. 2 and 3. This clock signal, having been stored in the bistable circuit F14, starts the oscillator 14 which, after performing five complete oscillations (FIG. 2), stops automatically in an essentially known manner.

Besides digital-to-analog converter 39, oscillator 14 feeds a pulse generator 15, adapted to produce a sampling pulse on line 40 each time the output waveform of the oscillator 14 passes through zero in an ascending direction, see FIG. 3. Said sampling pulses are used for selectively closing the sampling switches 17X, 17Y, 17Z. More particularly, the sampling pulses after going through a gate 21 having a function explained further on, are sent to switch 17X, 17Y or 17Z depending on whether the order now stored in the bistable circuits F1 to F10 is a positional order relating to axis X, Y or Z. For this purpose, the control terminals 20X, 20Y, 20Z of the switches are connected to the sampling pulse generator 15 through gates 22X, 22Y, 22Z, which are sequentially opened respectively under the control of the address signals X, Y, Z, obtained from the address decoder 3. If the order stored in the bistable circuits F1 to F10 is an auxiliary order, whereby among the four outputs X, Y, Z, A of the address decoder 3 only the output A is energized, none of the gates 22X, 22Y, 22Z is opened, so that none of the switches 17X, 17Y, 17Z is closed. In this case the address signal A produced by the address decoder 3 acts to put into operation a function decoder 23, for instance by opening normally closed electronic gates inserted between the inputs and the outputs of the decoder 23 and not shown in the drawings, whereby the ten-bit auxiliary order is decoded by the decoder 23 for controlling the corresponding auxiliary function of the machine tool, as explained later.

It should be noted that contrary to the known position control devices, each auxiliary order is identified as such by means of an address associated thereto. Therefore any required sequence of auxiliary orders may be recorded on contiguous rows of the tape. More generally, the association of an address to each positional or functional order and the special arrangement of said address relative to said order allows the cyclic sequence of the orders (X, Y, Z, A) to be dispensed for if necessary, the programmer being given a complete freedom in interlacing the orders on the tape.

From the foregoing it is clear that, upon reading a positional order relating to a given axis X, Y or Z, only the sampling switch 17X, 17Y or 17Z relating to said axis is closed, while the two remaining sampling switches are held open and that said switch remains closed only during the peaks of the output signal 13X, 13Y or 13Z respectively, of the corresponding position sensing device IX, IY or IZ respectively (FIGS. 1 and 2), so that the corresponding analog memory 18X, 18Y or 18Z respectively is charged to a voltage level, denoted by the *f* reference numeral 24 in FIG. 3, equal to the maximum amplitude of said output signal and, therefore, to a level representing the present value of the position error along said axis. It is thus apparent that any time one of the sampling switches 17X, 17Y, 17Z is closed, the error signal stored in the analog memory 18X, 18Y, 18Z connected thereto is updated so as to be made equal to the error signal (maximum amplitude of the sinusoidal waveform) issuing at that moment from the corresponding amplifier 16X, 16Y or 16Z respectively of the position sensing device IX, IY or IZ respectively of the relevant axis. Therefore, due to the analog storage properties of the condensers 18X, 18Y, 18Z, the servoamplifiers 19X, 19Y and 19Z are fed with a continuous error signal, whereby continuous energization of the servomotors SMX, SMY and SMZ is achieved, notwithstanding the fact that the sampling switch 17X, 17Y, 17Z of the corresponding axis is closed only five times at 0.1 milli-second intervals, then remains open during the sampling of the other axes, say during an approximately 20 millisecond interval, then is again closed five times at 0.1 millisecond intervals and so on.

The servomotors SMX, SMY, SMZ used in the position control apparatus may suitably be of the type capable of driving the movable member of the machine at a velocity proportional, along each axis, to the output signal of the corresponding servoamplifiers 19X, 19Y, 19Z. In this case, when a new positional order reaches one of the memory condensers 18X, 18Y, 18Z, whereby the charge level of this condenser is changed to the new level proportional to the present positional error, the movable member of the machine is caused to change its velocity along the relevant axis in proportion to the change of said level. Thus the machine responds in the direction of said axis at a velocity proportional to the new positional error. It is to be noted that the servo loop controlling a servomotor SMX, SMY or SMZ is closed only at spaced time intervals, that is during the sampling pulse which closes the corresponding switch 17X, 17Y or 17Z respectively. Therefore, after reading said new order, the machine continues, along said axis, at this velocity until a new positional error level is stored in the corresponding condenser, while the positional orders for other axes or the auxiliary orders are being processed.

It is therefore apparent that a given positional order would be different from the next preceding one by such an amount as to make it coincide with the place where the machine will be when said given order is read, plus the additional distance determined by the programmer to call for the desired velocity.

A change in the level 24 of the memory condenser 18X, 18Y or 18Z represents a change in velocity of the machine and therefore acceleration along the relevant axis. In preparing the program tape, by taking into account the characteristics of the machine in its ability to accelerate, the distance between the positions represented by the successive positional orders may be determined so as to ensure the proper velocity.

As appears from the above description, since all the order and address bits relating to each positional order or to each auxiliary order are recorded in parallel arrangement on the tape, then processed in parallel, there are thus eliminated the complicated internal synchronizing circuits and serial-to-parallel converters, which are required in similar known devices for controlling machine tools.

Furthermore, according to an important characteristic feature of this invention, the above mentioned parallel arrangement of the bits on the tape allows the machine tool to be controlled by reading the tape in either direction, so as to obtain different profiles with the same programming tape.

According to a further characteristic feature of the invention, after the reading from the tape of a new order, pertaining to a certain axis, the closing of sampling switch 17X, 17Y or 17Z of said axis is also conditional on the result of a comparison between the position error signal 24 stored in the condenser type memory (18X, 18Y, 18Z respectively) and the position error signal produced, on the output 13X, 13Y, 13Z respectively, as a result of the reading of said new order, so that the last named position error signal corresponding to the new order is sent to the analog memory 18X, 18Y, 18Z respectively to replace the old one only if it does not differ too much from the old one. On the contrary, should the difference between said two position error signals being now compared be exceedingly great, so that, in view of the continuity of the profile to be cut by the machine tool, the new order is likely to be wrong, then the new order itself is ignored, and the servomotor of the corresponding axis continues to be controlled by the error signal stored in the condenser type memory 18X, 18Y, 18Z and corresponding to the difference between the actual position of the movable member and the position represented by the last order deemed to be acceptable. Ignoring a positional order without appreciably affecting the correct continuity of the profile to be cut is made possible by the fact that the contiguous positional orders recorded on the tape represent points very near to one another along the profile.

For carrying out said comparison there is provided, for each axis, an amplitude fault checking circuit 25X, 25Y, 25Z respectively, having two input terminals connected with the two poles of switch 17X, 17Y or 17Z respectively and supplying a signal on the output terminal 26X, 26Y or 26Z respectively, throughout the time during which the difference between the signals on the two input terminals exceeds a predetermined value.

The signals produced by the amplitude fault checking circuits 25X, 25Y, 25Z are sent, through gates 27X, 27Y, 27Z respectively, to reset a bistable circuit which is set by each clock signal S read on track P14 of the tape.

When set, the bistable circuit 28 keeps open the gate 21, through which the sampling pulses produced by the sampling pulse generator 15 are sent to the control terminals 20X, 20Y, 20Z of the sampling switches 17X, 17Y, 17Z via gates 22X, 22Y, 22Z respectively.

As shown in FIG. 1, the opening of the gates 27X, 27Y, 27Z is conditional on the presence of the address signals X, Y, Z from the address decoder 3, so that the output 26X, 26Y, 26Z of each fault checking circuit 25X, 25Y, 25Z is used to control the connected circuits only when there is present in the bistable circuits F1 to F10 a positional order relating to the corresponding axis. Furthermore, said gates 27X, 27Y, 27Z are opened only in presence of the sampling pulses produced by the sampling pulse generator 15, which occur, as mentioned above, only at the peaks of the sinusoidal signals obtained on the output terminals 13X, 13Y, 13Z of the position sensing devices IX, IY, IZ (FIG. 3).

It is therefore clear that each amplitude fault checking circuit 25X, 25Y, 25Z compares the amplitude of the signal stored in the associated condenser type memory 18X, 18Y, 18Z respectively with the maximum amplitude of the output signal of the associated position sensing device IX, IY, IZ respectively, which output signal, as already stated, represents the position error corresponding to the order being now read on tape and stored in the bistable circuits F1 to F10.

Moreover, the device according to the invention is provided with a protective circuit capable of stopping the machine if a not permissible sequence of wrong orders occurs.

More specifically, for each axis X, Y, Z, there is provided a bistable circuit 30X, 30Y, 30Z, which is reset immediately before the reading on the tape of each positional order relating to said axis; since the address signals follow one another in the cyclic sequence X, Y, Z, A, X, Y, Z, A, etc., as already explained, this resetting action can be obtained by causing the bistable circuits 30X, 30Y, or 30Z to be reset by the address signal A, X or Y from the address decoder 3 respectively, as shown in FIG. 1. On the other hand, each bistable circuit 30X, 30Y, 30Z is set by the fault amplitude indicating signal, if any, obtained on the output of the gate 27X, 27Y, or 27Z of the corresponding axis. Therefore, with reference e.g. to axis X, the bistable circuit 30X will remain reset during the reading of an order A, and set during the reading of orders X, Y and Z, in the event of order X having been deemed unacceptable by the amplitude fault checking circuit 25X; it will, instead, remain reset during the reading of all four orders A, X, Y, Z if order X has been deemed acceptable. The bistable circuits 30Y and 30Z will operate in a similar manner. One output of each bistable circuit 30X, 30Y, 30Z feeds a condenser type integrating circuit 31X, 31Y or 31Z respectively, comprising a condenser which is charged with a first time constant when the output of the bistable circuit 30X, 30Y or 30Z connected thereto is energized, and is discharged with a second time constant when said output is deenergized, and a threshold circuit capable of supplying, on the output of the integrating circuit, a signal when the charge level of the condenser exceeds a predetermined threshold level. The output signals of the integrating circuits 31X, 31Y and 31Z control through a relay 32 the stopping of the machine. Said threshold level is adjusted to a value equal to the charge level produced in the condenser by a series of K consecutive faulty positional orders. Obviously the threshold level is reached also in the case of a series of K′ non-consecutive faulty positional orders interleaved with acceptable orders, K′ exceeding K an amount depending on the distribution of the acceptable and unacceptable orders within said series of K′ orders, and also depending on the magnitude of the aforementioned time constants. The threshold level and the time constants may be conveniently made adjustable by the operator. A machine tool control device has been successfully operated with such a setting of said variables, that the machine was stopped upon reading three consecutive faulty positional orders, or two pairs of contiguous faulty order interleaved with a pair of contiguous acceptable orders etc.

With respect to the foregoing it is to be remembered that the information stored on the tape has some degree of redundancy, whereby one may ignore some positional orders without substantially affecting the correctness of the profile being cut.

The generation of each address signal X, Y, Z, A in the address decoder 3, FIG. 1, is, furthermore, conditional on the parity check carried out on the group of thirteen bits to which said address signal refers.

More particularly, the outputs of the bistable circuits F1 to F13 feed a parity check circuit 33, of the type disclosed in U.S. Pat. 3,129,406, which produces a signal on its output 34 only if the number of bits equal to "1" among the thirteen bits of the group being read on the tape and stored in said bistable circuits is odd. The output 34 is fed to control the "and" gates 4, 5, 6, 7 of the address decoder 3, whereby the outputs of said gates can be energized only if the order being now read on tape has the correct parity. Therefore, each positional or auxiliary order, that presents a parity error is automatically ignored, because the absence of the corresponding address signal X, Y, Z or A prevents the switches 17X, 17Y, 17Z, respectively from being closed or the auxiliary order decoder 23 respectively from being made operative.

Each output terminal 35 of the auxiliary order decoder 23, FIG. 1, feeds the corresponding control mechanism of the associated auxiliary function, e.g. an electromagnet 36, through an integrating circuit 37, so that the electromagnet 36 is energized only if the corresponding auxiliary order has been repeated at least a predetermined number of times. The output signal of the bistable circuit F14, delayed by a delay circuit 38, is furthermore used for resetting the bistable circuits F1 to F14, FIG. 1.

The operation of the position control device will now be briefly described.

Assuming all the bistable circuits have been initially reset and the tape has been put in motion, the tape reader 2, FIG. 1, reads the first row of thirteen bits, which is assumed to be relative, e.g., to axis X. Said bits are stored in the bistable circuits F1 to F13. Consequently, the output terminal X of the address decoder 3 is energized to produce the address signal X, provided in the parity check circuit 33 said row of bits has proven to have the correct parity. Therefore gates 27X, and 22X, FIG. 1, are opened by address signal X.

Approximately 3 milliseconds later a clock pulses is read on the tape so that the bistable circuit F14 is set.

Thereupon, oscillator 14 starts and, consequently, the output terminals 11 and 12 of the digital-to-analog converter 39 are activated. The fault amplitude checking circuit 25X compares continuously the signal issuing from amplifier 16X with the signal stored in the analog memory 18X at the input of servo-amplifier 19X. Furthermore, the bistable circuit 28 is set by the output of bistable circuit F14, in case it has not yet been set, FIG. 1.

When the first positive peak of the 10 kHz. error signal occurs, the sampling pulse generator 15 produces the first sampling pulse on lead 40. If, as a result of the comparison carried out in the amplitude fault checking circuit 25X, the positional order just read on tape has proven to be acceptable, the output 26X of the checking circuit 25X is not energized, whereby said sampling pulse does not energize the output of gate 27X and, therefore, does not reset the bistable circuit 28. Therefore the gate 21 remains open, and the sampling pulse itself is sent to close momentarily the switch 17X, so that the position error signal then produced by the position sensing device IX on the output terminal 13X is transferred to memory 18X, to replace the previous position error signal stored therein, whereby control of the servomotor SMX is devolved to new positional order just read on the tape.

The bistable circuit 28 having been left set, also the four subsequent sampling pulses produced by the pulse generator 15 at the four subsequent positive peaks of the oscillator output waveform are similarly sent to close momentarily switch 17X, so that the position error signal produced by position sensing device IX is repeatedly sent to memory 18X, so as to complete, if necessary, the memory condenser charge up to the new voltage level.

When the five oscillation periods of oscillator 14 are completed, the clock signal S, delayed by circuit 38, resets the bistable circuits F1 to F14 to prepare the device for the reading of the subsequent order, which, as previously stated, will refer to the axis Y.

Figure 4:
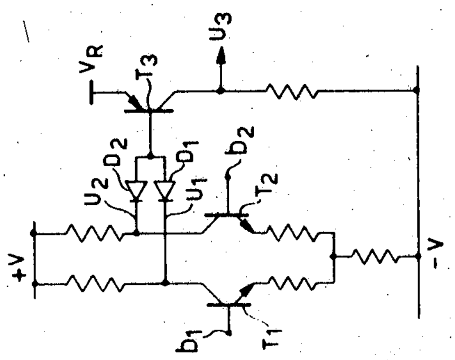
FIG. 4 shows some details of the amplitude fault checking circuit used in the position control device illustrated in FIG. 1.

Each amplitude fault checking circuit 25X, 25Y, 25Z, comprises (FIG. 4) a differential amplifier, consisting of two transistors T1 and T2 in common emitter configuration, whose base terminals $b1$ and $b2$ are fed with the two signals to be compared, after suitable amplification. On output terminals U1 and U2 there is obtained a voltage depending on the difference between the amplitude of the two input signals being compared.

As long as outlets U1 and U2 have a potential equal to, or higher than, a reference potential VR, at which the emitter of a transistor T3 is permanently held—which happens when the two input signals do not differ too much from each other—transistor T3 is nonconductive, so that the potential of the output terminal U3 is near −V.

If, instead, the signal present on terminal $b1$ is considerably higher or lower than the signal on terminal $b2$, then the output terminal U1, U2 respectively, switches to a potential considerably lower than VR, so that, through diode D1, or D2, sufficient base current is produced in transistor T3 to bring the transistor itself into conduction, and the output U3 terminal rises to a potential near to VR.

It is intended that many changes, additions of parts and improvements may be made to the above described device without departing from the scope thereof.

What I claim is:

1. In a control device for positioning a member of a machine tool and similar equipment, said member being movable along at least two axes, (a) a servomotor for each axis responsive to sinusoidal position-error signals applied thereto for moving said member along said axis, (b) a program device for supplying successive positional orders, each one representing a position of said member along one of said axes and having associated therewith an address identifying said order as pertaining to the last mentioned axis, (c) means common to all said axes and connected to said program device for receiving said order and supplying it to an output channel as a sinusoidal positional order signal, (d) a different position sensing transformer allotted to each axis and having at least a primary winding and a secondary winding, one of said windings being movable with said member, the primary windings of all said transformers being connected in series with each other to said output channel and the secondary winding of each transformer being connected through an individual switch to the servomotor of the corresponding axis, (e) and means connected to said program device for receiving said address and closing the switch of the axis indicated by said address.

2. In a control device for moving a member of a machine tool and similar equipment along a predetermined continuous trajectory, said member being movable along at least two axes, (a) a servomotor for each axis responsive to sinusoidal position-error signals applied thereto for moving said member along said axis, (b) a program device for supplying successive positional orders, each one representing in digital form an instantaneous position of said member along one of said axes and having associated therewith an address identifying said order as pertaining to the last mentioned axis, (c) a signal source responsive to said program device upon supplying said order for producing a sinusoidal reference signal having a plurality of cycles, (d) a digital-to-analog converter common to all said axes, fed by said source and connected to said program device for receiving said order and supplying it to an output channel as a sinusoidal positional order signal, (e) a position sensing transformer for each axis having at least a primary winding and a secondary winding, one of said windings being movable with said member, the primary windings of all said transformers being connected in series with each other to said output channel and the secondary winding of each transformer being connected through an individual switch to the servomotor of the corresponding axis, (f) means fed by said source for generating a sampling pulse for each cycle of said sinusoidal reference signal, (g) and means connected to said program device for receiving said address and closing the switch of the axis indicated by said address upon receiving a sampling signal.

3. In a control device for moving a member of a machine tool and similar equipment along a predetermined continuous trajectory, (a) a program device for supplying successive orders each one representing a successive instantaneous position of said member along said trajectory, (b) storage means for storing an order, (c) means for comparing each supplied order with the stored order to provide a signal if the difference of the two compared orders does not exceed a predetermined limit, (d) switching means responsive to said signal for connecting said program device to said storage means to transfer said supplied order into said storage means, (e) and a servomotor responsive to said stored order for moving said member in accordance thereto.

4. In a control device for moving a member of a machine tool and similar equipment along a predetermined continuous trajectory, (a) a program device for supplying successive orders each one representing a successive instantaneous position of said member along said trajectory, (b) a position-error sensing device fed by said program device and associated with said member for producing an error signal equal to the difference between the present position of said member and the position represented by said supplied order, (c) means for storing an error signal, (d) means for comparing each produced error signal with the stored error signal to provide a switching signal if the difference of the two compared error signals does not exceed a predetermined limit, e) switching means responsive to said switching signal for connecting said position-error sensing device to said storage means to transfer said produced error signal into said storage means, (f) and a servomotor responsive to said stored error signal for moving said member.

5. In a control device for moving a member of a machine tool and similar equipment along a predetermined continuous trajectory, (a) a program device for supplying successive orders each one representing a successive instantaneous position of said member along said trajectory, (b) means fed by said program device for detecting wrong orders among said supplied orders, (c) a servosystem controlled by said supplied orders for moving said member, (d) means fed by said detecting means for preventing wrong orders from controlling said servosystem, (e) and alarm means responsive to said detecting means upon occurrence of predetermined sequences of wrong orders.

6. In a programmed control system for controlling a machine-tool in at least two directions of movement in dependence on recorded digital program data, which comprises in respect to each said direction a sequence of digital numbers in binary notation representing either, (a) a succession of instantaneous positions spaced along the relevant directions, or (b) auxiliary orders, a digital data record on which said sequences of numbers relating to the respective directions of movement or auxiliary orders are recorded, all digits of each such number and address digits identifying the number as pertaining to a position or auxiliary function appearing in parallel fashion in the same row transversely of the record and the record having a channel for a signal for clock pulses, this signal occurring once with the number command for each direction of movement of the machine-tool; means for reading said recorded sequences of numbers, common processing equipment for said sequences of numbers, as read, said equipment being connected to the reading means for receiving the read sequences of numbers therefrom and processing them preparatory to use and comprising a flip-flop providing temporary storage for each binary bit of the recorded number in the sequences; positioning servomotors for driving the machine elements in the relevant direction and means for applying the processed position number to the error channel pertinent to one axis of the machine for controlling the relevant servomotor prior to reading the position number for the next axis, said applying means comprising an excitation oscillator activated by said clock pulse signals for generating signals which allow the error channels to operate only during the clock pulses, said oscillator also generating a reset pulse to return said flip-flops to zero and stop said oscillator.

7. In a programmed control system for controlling a machine-tool in at least two directions of movement in dependence on recorded digital program data which comprises in respect to each said direction a sequence of digital numbers in binary notation representing either, (a) a succession of instantaneous positions spaced along the relevant directions, or (b) auxiliary orders, a digital data record on which said sequences of numbers relating to the respective direction of movement or auxiliary orders are recorded, all digits of each such numbers and address digits identifying the number as pertaining to position or auxiliary function appearing in parallel fashion in the same row transversely of the record, means for simultaneously reading the number and address digits of each row and means for processing said sequences of numbers and digits as read, the pitch between two successive transversal rows of recorded data being constant and the position order pertinent to an axis of movement representing the relevant absolute coordinate of a point along the trajectory.

8. An arrangement for study path control of machines, and machine tools in particular, in several coordinate directions in conjunction with control commands stored on a program tab in a mutually interwoven manner and which are composed of a position signal and an address which arranges the position signal into one of the coordinate directions and which are fed to a single common digital analog converter, control motors positioned to each coordinate axis, one of said motors connected to each axis controlled by said control commands by means of position-scanning transformers with one or more primary windings and a secondary winding, characterized in that the corresponding primary windings of these position-scanning transformers are connected in series to one another and to the output of the digital analog converter, and that each secondary winding is connected to the appropriate position motor by means of a switch controlled by the corresponding address.

References Cited

UNITED STATES PATENTS

| | | | |
|---|---|---|---|
| 2,685,054 | 7/1954 | Brenner et al. | 318—28 |
| 3,069,608 | 12/1962 | Forrester et al. | 318—162 |
| 3,209,222 | 9/1965 | Holy | 318—28 |
| 3,262,035 | 7/1966 | Gough | 318—18 XR |
| 3,286,085 | 11/1966 | Rado | 340—172.5 XR |
| 3,356,994 | 12/1967 | Elbling | 340—172.5 |
| 2,998,560 | 8/1961 | Mottu | 318—28 |
| 3,340,451 | 9/1967 | Farrand | 318—28 |

BENJAMIN DOBECK, Primary Examiner

U.S. Cl. X.R.

318—24, 30